(12) United States Patent
Moritomi

(10) Patent No.: US 6,258,881 B1
(45) Date of Patent: Jul. 10, 2001

(54) POLYPHENYLENE ETHER RESIN COMPOSITION

(75) Inventor: Satoru Moritomi, Sodegaura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/413,189

(22) Filed: Oct. 5, 1999

(30) Foreign Application Priority Data

Oct. 7, 1998 (JP) .................................................. 10-285194

(51) Int. Cl.⁷ .............................. C08L 71/12; C08L 83/04
(52) U.S. Cl. ........................ 524/267; 524/266; 524/268; 525/905
(58) Field of Search ..................................... 524/267, 266, 524/268; 525/905

(56) References Cited

U.S. PATENT DOCUMENTS

| 4,107,232 | 8/1978 | Haaf et al. . |
| 4,332,714 | 6/1982 | Haaf et al. . |
| 4,355,126 | 10/1982 | Haaf et al. . |
| 5,100,958 | * 3/1992 | Fuhr et al. . |
| 5,169,887 | 12/1992 | Snow et al. . |
| 5,206,276 | 4/1993 | Lee, Jr. . |
| 5,294,655 | 3/1994 | Lee, Jr. et al. . |
| 5,621,029 | * 4/1997 | Eckel et al. . |
| 5,916,952 | * 7/1999 | Romenesko et al. . |

FOREIGN PATENT DOCUMENTS

| 0767204A2 | 4/1997 | (EP) . |
| 0829521A1 | 3/1998 | (EP) . |
| 2294934 | 5/1996 | (GB) . |
| 57-207641 | 12/1982 | (JP) . |
| 57-207642 | 12/1982 | (JP) . |
| 59-202240 | 11/1984 | (JP) . |

* cited by examiner

*Primary Examiner*—Robert Dawson
*Assistant Examiner*—Marc S. Zimmer
(74) *Attorney, Agent, or Firm*—Birch, Stewart, Kolasch & Birch, LLP

(57) ABSTRACT

There is provided a polyphenylene ether resin composition comprising:

a component (A) containing a polyphenylene ether resin; and a component (B) containing an organopolysiloxane comprising respective structure units represented by the following formulas (I), (II) and (III)

$$R^1R^2SiO_{1.0} \qquad (I)$$

$$R^3SiO_{1.5} \qquad (II)$$

$$R^4R^5R^6SiO_{0.5} \qquad (III)$$

wherein $R^1$, $R^2$ and $R^3$ are independently of one another an alkyl group having 1 to 3 carbon atoms or an aryl group having 6 to 10 carbon atoms, and $R^4$, $R^5$ and $R^6$ are independently of one another an alkyl group having 1 to 6 carbon atoms, an aryl group having 6 to 12 carbon atoms, an alkoxy group having 1 to 6 carbon atoms or a hydroxyl group; and wherein:

(i) the component (B) is present in an amount of from about 0.5 to 100 parts by weight based on 100 parts by weight of the component (A); and (ii) the component (A) forms a continuous phase, and the component (B) forms a dispersed phase containing dispersed particles.

7 Claims, No Drawings

POLYPHENYLENE ETHER RESIN COMPOSITION

FIELD OF THE INVENTION

The present invention relates to a polyphenylene ether resin composition. More specifically, the present invention relates to a polyphenylene ether resin composition comprising a polyphenylene ether resin and a specific organopolysiloxane, but neither any halogen-containing flame retardant nor any phosphorus-containing flame retardant as an essential or mandatory component, and exhibiting a superior flame resisting property.

BACKGROUND OF THE INVENTION

Polyphenylene ether resins are superior in their mechanical properties, electric properties, heat resistance, hydrolysis resistance and dimensional stability, and are extensively used as thermoplastic engineering plastic resins.

As a flame resisting polyphenylene ether resin composition, there is known a resin composition comprising a polyphenylene ether resin and a halogen-containing flame retardant or a phosphorus-containing flame retardant. Nowadays, however, a polyphenylene ether resin composition comprising neither any halogen-containing flame retardant nor any phosphorus-containing flame retardant is increasingly required, because of an anxiety such that such a flame retardant may affect the environment.

As a polyphenylene ether resin composition comprising neither the halogen-containing flame retardant nor the phosphorus-containing flame retardant and having an improved flame resistance, U.S. Pat. No. 5,169,887 discloses a composition comprising a polyphenylene ether resin and a liquid straight chain phenylsiloxane.

In addition, U.S. Pat. No. 5,294,655 discloses a composition having an improved flame resistance, which comprises a polyphenylene ether resin, a liquid straight chain phenylsiloxane and a block copolymer elastomer.

Each of the references referred to above is incorporated herein by reference in its entirety.

Although the compositions disclosed in the above U.S. Patents are superior in their flame resistance to the polyphenylene ether resin per se, its level is not satisfactory. Particularly, there is left a problem in that when the polyphenylene ether resin is used in combination with a polystyrene resin, the resulting polyphenylene ether resin composition is insufficient in its flame resistance.

SUMMARY OF THE INVENTION

Accordingly, an object of the present invention is to provide a polyphenylene ether resin composition which comprises neither a halogen-containing flame retardant nor a phosphorus-containing flame retardant as an essential or mandatory component, and exhibits a superior flame resistance.

The present inventor has undertaken extensive studies with respect to studying the flame resistance of polyphenylene ether resin compositions. As a result, it has been found that a resin composition comprising a polyphenylene ether resin and a specific organopolysiloxane can meet said object, and thereby the present invention has been obtained.

The present invention provides a polyphenylene ether resin composition comprising:

a component (A) containing a polyphenylene ether resin; and a component (B) containing an organopolysiloxane comprising respective structure units represented by the following formulas (I), (II) and (III)

$$R^1R^2SiO_{1.0} \quad (I)$$

$$R^3SiO_{1.5} \quad (II)$$

$$R^4R^5R^6SiO_{0.5} \quad (III)$$

wherein $R^1$, $R^2$ and $R^3$ are independently of one another an alkyl group having 1 to 3 carbon atoms or an aryl group having 6 to 10 carbon atoms, and $R^4$, $R^5$ and $R^6$ are independently of one another an alkyl group having 1 to 6 carbon atoms, an aryl group having 6 to 12 carbon atoms, an alkoxy group having 1 to 6 carbon atoms or a hydroxyl group; and wherein:

(i) the component (B) is present in an amount of from about 0.5 to 100 parts by weight based on 100 parts by weight of the component (A); and (ii) the component (A) forms a continuous phase, and the component (B) forms a dispersed phase containing dispersed particles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The polyphenylene ether resin used in the present invention, is a homopolymer resin or a copolymer resin obtained by oxidatively polymerizing at least one phenol compound represented by the following formula (IV) with oxygen or an oxygen-containing gas with the aid of an oxydative coupling catalyst,

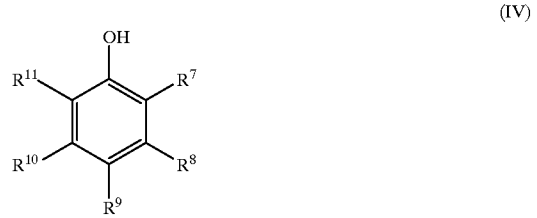

(IV)

wherein $R^7$, $R^8$, $R^9$, $R^{10}$ and $R^{11}$ are independently of one another a hydrogen atom, a halogen atom, a hydrocarbon group or a substituted hydrocarbon group, provided that at least one of them is always a hydrogen atom.

Examples of $R^7$, $R^8$, $R^9$, $R^{10}$ and $R^{11}$ in the formula (IV) are hydrogen, chlorine, bromine, fluorine, iodine, methyl, ethyl, n- or iso-propyl, pri-, sec- or t-butyl, hydroxyethyl, phenylethyl, benzyl, hydroxymethyl, carboxyethyl, methoxycarbonylethyl, cyanoethyl, phenyl, methylphenyl, dimethylphenyl, ethylphenyl and allyl.

Examples of the phenol compound represented by the formula (IV) are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol and 2-methyl-6-allylphenol. Among these phenol compounds, 2,6-dimethylphenol, 2,6-diphenylphenol, 3-methyl-6-t-butylphenol and 2,3,6-trimethylphenol are preferred.

The phenol compound represented by the formula (IV) may be copolymerized with a polyhydric aromatic compound such as bisphenol-A, resorcinol, hydroquinone and novolak resins to prepare a copolymer. In the present invention, the copolymer is also contained in the polyphenylene ether resin according to the present invention.

The oxidative coupling catalyst used for the oxidative (co)polymerization of said phenol compound is not particularly limited, and any catalyst having a polymerizing ability can be used.

As a process for oxidatively (co)polymerizing the phenol compound to produce the polyphenylene ether resin, there are exemplified those disclosed in, for example, U.S. Pat. Nos. 3306874, 3306875 and 3257357, Japanese Patent Publication (JP-B) No. 52-17880, Japanese Patent Kokai (JP-A) Nos. 50-51197 and 1-304119. Each of these references is incorporated herein by reference in its entirety.

Specific examples of the polyphenylene ether resin used in the present invention are poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly($^2$-ethyl-6-propyl-1,4-phenylene ether), poly(2,6-dibutyl-1,4-phenylene ether), poly(2,6-dipropenyl-1,4-phenylene ether), poly(2, 6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2-methyl-6-phenyl-1,4-phenylene ether), poly(2-methyl-1,4-phenylene ether), poly(2-ethoxy-1,4-phenylene ether), poly(3-methyl-6-t-butyl-1,4-phenylene ether), poly(2,6-dibenzyl-1,4-phenylene ether) and copolymers of every descriptions containing a number of the repeating units constituting the above-exemplified resins.

Further, a copolymer of a multi-substituted phenol such a[]s 2,3,6-trimethylphenol and 2,3,5,6-tetramethylphenol with a 2-substituted phenol such as 2,6-dimethylphenol is also contained in the polyphenylene ether resin according to the present invention.

Among the polyphenylene ether resins exemplified above, preferred are poly(2,6-dimethyl-1,4-phenylene ether) and a copolymer of 2,6-dimethylphenol with 2,3,6-trimethylphenol.

The polyphenylene ether resin used in the present invention may be a graft copolymer obtained by grafting the above-mentioned (co)polymer with a styrene compound such as styrene, α-methylstyrene, p-methylstyrene and vinylstyrene, and such a graft copolymer is also contained in the polyphenylene ether resin according to the present invention.

With respect to the polyphenylene ether resin used in the present invention, those having an intrinsic viscosity of from about 0.3 to 0.7 dl/g, preferably from about 0.36 to 0.65 dl/g, more preferably from about 0.40 to 0.6 dl/g, measured in chloroform of 30° C. are preferred. When the intrinsic viscosity is too low, it may be difficult to attain no-dripping at the time of combustion, and when it is too high, the polyphenylene ether resin composition in accordance with the present invention may be deteriorated in its molding processability. Here, what is meant by the term "no-dripping" is that a sample in the course of burning is not observed to drip in a flame resistance test, that is, a UL 94 vertical combustion test.

With respect to the structure units represented by the formulas (I), (II) and (III), which are given for definition of the component (B), that is , the organopolysiloxane used in the present invention, the formula (I) stands for a divalent structure unit expressing non-terminal parts (parts which are not terminal) of the molecule, the formula (II) stands for a trivalent structure unit expressing non-terminal parts of the molecule and the formula (III) stands for a univalent structure unit expressing a terminal part of the molecule. Therefore, the structure unit of the formula (I) forms a straight chain structure, and the structure unit of the formula (II) forms a two- or three-dimensional network or branched structure.

Here, the term "structure unit" is intended to mean a chemical structure unit constituting a compound. For example, a compound represented by the following formula (V) (its molecular formula being $C_{12}H_{36}Si_5O_4$) can be said to be a compound composed of one structure unit of $(CH_3)_2SiO_{1.0}$ (its formula being $C_2H_6SiO_{1.0}$), one structure unit of $(CH_3)SiO_{1.5}$, and three structure units of $(CH_3)_3SiO_{0.5}$ (its formula being $C_9H_{27}Si_3O_{1.5}$).

(V)

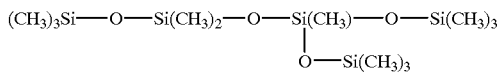

In the formulas (I) and (II), $R^1$, $R^2$ and $R^3$ are independently of one another an alkyl group having 1 to 3 carbon atoms or an aryl group having 6 to 10 carbon atoms. A preferred alkyl group is a methyl group, and a preferred aryl group is a phenyl group.

When $R^1$, $R^2$ and $R^3$ stand for aryl groups, the proportion of the aryl groups is preferably from about 30 to 80% by mole based on the total mole of these substituents. When the proportion of the aryl groups is too low, the polyphenylene ether resin composition obtained may become unsatisfactory in its flame resistance due to a poor compatibility between the component (A) and the component (B). Whereas, when the proportion of the aryl groups is too high, the polyphenylene ether resin composition obtained may become unsatisfactory in its impact resistance.

In the formula (III), $R^4$, $R^5$ and $R^6$ are independently of one another an alkyl group having 1 to 6 carbon atoms, an aryl group having 6 to 12 carbon atoms, an alkoxy group having 1 to 6 carbon atoms or a hydroxyl group. From a balanced viewpoint between the flame resistance and the mechanical properties of the polyphenylene ether resin composition obtained, a methyl group and a hydroxyl group are preferred.

In the polyphenylene ether resin composition in accordance with the present invention, the polyphenylene ether resin forms a continuous phase and the organopolysiloxane forms a dispersed phase composed of dispersed particles. A preferred average particle size of the dispersed particles is from about 0.08 to 5 μm. When the average particle size is less than about 0.08 μm, the polyphenylene ether resin composition obtained may become unsatisfactory in its flame resistance, whereas, when the average particle size is more than about 5 μm, there may be caused unfavorable results such as a delamination of molded products at the time the polyphenylene ether resin composition is molded by a molding method such as injection molding. The average particle size can be determined in a manner such as where a very thin slice prepared from the polyphenylene ether resin composition is photographed by a transmission electron microscope, and the particle size of the dispersed particles in the photograph is measured.

The component (B) is preferably in a solid state at 25° C. When the component (B) in a liquid state at 25° C. is used, dispersibility of the component (B) may be deteriorated because of too large difference in melt viscosity between the component (B) and the polyphenylene ether resin, so that the resin composition to be obtained may become unsatisfactory in its flame resistance.

A preferred weight average molecular weight of the component (B) in terms of polystyrene is from about 500 to 9500. When the weight average molecular weight is less than about 500, the polyphenylene ether resin composition may become unsatisfactory in its flame resistance, whereas, when the weight average molecular weight is more than about 9500, the dispersed particle size of the component (B) is made large so that there may be caused unfavorable results such as delamination of molded products at the time the polyphenylene ether resin composition is molded by a molding method such as injection molding.

The organopolysiloxane used in the present invention can be produced by a conventional production process of organopolysiloxanes. There is exemplified a production process wherein a mixture of a diorganodichlorosilane and a monoorganotrichlorosilane is subjected to hydrolysis, thereby obtaining a organopolysiloxane formed through a partial condensation of both siloxanes, and then reacting the condensate with a triorganochlorosilane to obtain the desired organopolysiloxane.

A ratio by mole of a content proportion of the structure unit represented by the formula (I) to a content proportion of the structure unit represented by the formula (II) is preferably from about 10:1 to about 0.1:1. When the content of the structure unit represented by the formula (II) is too low, the polyphenylene ether resin composition may become unsatisfactory in its flame resistance. Whereas, when the content of the structure unit represented by the formula (II) is too high, the polyphenylene ether resin composition may become unsatisfactory in its impact resistance.

A content of the component (B) in the polyphenylene ether resin composition of the present invention is from about 0.5 to 100 parts by weight, preferably from about 0.5 to 70 parts by weight, based on 100 parts by weight of the component (A). When the content of the component (B) is too low, the present polyphenylene ether resin composition may become unsatisfactory in its flame resistance and its moldability, and when the content of the component (B) is too high, the polyphenylene ether resin composition may become unsatisfactory in its heat resistance.

If desired, the components (A) and (B) used in the present invention may be used in combination with other components in a manner such that the objects and the effects of the present invention are not impaired. Said other components contain, for example, thermoplastic polymers such as polystyrene resins, styrene based elastomers and polyolefins, which are used for improving properties of the present polyphenylene ether resin composition, such as processability and impact resistance; and fillers used for reinforcing the present polyphenylene ether resin composition, imparting any function to said composition and weighting said composition to practice economy.

The polystyrene resin, one of said other components, means a resin comprising at least 25% by weight of a repeating unit derived from an aromatic vinyl compound represented by the following formula (VI), said polystyrene resin being hereinafter referred to as component (C).

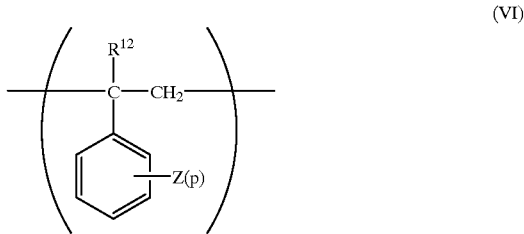

(VI)

In the above formula, $R^{12}$ is a hydrogen atom or an alkyl group having 1 to 4 carbon atoms, such as, methyl, ethyl, propyl and butyl, Z is a halogen atom such as chlorine, bromine, fluorine and iodine, or an alkyl group having 1 to 4 carbon atoms such as methyl, ethyl, propyl and butyl, and p is 0 or an integer of from 1 to 5.

Examples of the component (C) are homopolymers and copolymers of styrene or its derivatives such as p-methylstyrene, α-methylstyrene, α-methyl-p-methylstyrene, chlorostyrene and bromostyrene, and a rubber-modified high impact polystyrene comprising about 70 to 99% by weight of the repeating structure unit of the formula (VI) and about 1 to 30% by weight of a diene rubber, the high impact polystyrene being hereinafter referred to as HIPS.

Examples of the diene rubber constituting HIPS are homopolymers and copolymers of conjugated diene compounds such as butadiene, isoprene and chloroprene; copolymers of said conjugated diene compounds with unsaturated nitrile compounds such as acrylonitrile and methacrylonitrile, and/or aromatic vinyl compounds such as styrene, p-methylstyrene, α-methylstyrene, α-methyl-p-methylstyrene, chlorostyrene and bromostyrene; natural rubbers; and their mixtures. Particularly preferred diene rubbers are polybutadiene and butadiene-styrene copolymer. Production processes of HIPS are known in the art, and contain an emulsion polymerization process, a suspension polymerization process, a bulk polymerization process, a solution polymerization and a process of a combination thereof.

A content of the component (C), if any, in the present polyphenylene resin composition, is preferably from about 1 to 1000 parts by weight, more preferably from about 10 to 800 parts by weight, based on 100 parts by weight of the component (A). When the content of the component (C) is too high, the polyphenylene ether resin composition may become insufficient in its heat resistance, and when the content of the component (C) is too low, the polyphenylene ether resin composition may become insufficient in its flowability when melted.

The styrene based elastomer, one of said other components, is not particularly limited in kind, and contains those known in the art. Examples thereof are styrene-butadiene block copolymers having at least one polystyrene block and at least one polybutadiene block; styrene-isoprene block copolymers having at least one polystyrene block and at least one polyisoprene block; block copolymers having at least one polystyrene block and at least one isoprene-butadiene copolymer block; block copolymers wherein unsaturated bonding parts of the polyisoprene block, polybutadiene block and the isoprene-butadiene copolymer block in the above block copolymers are selectively hydrogenated, which are hereinafter referred to as "hydrogenated block copolymers"; and graft copolymers obtained by graft-polymerizing a polyolefin elastomer with styrene, the polyolefin elastomer being produced by copolymerizing two or more monomers selected from ethylene, propylene, butene and the aforementioned conjugated diene compounds, the graft copolymers being hereinafter referred to as "styrene graft polyolefins". Of these, the hydrogenated block copolymers and the styrene graft polyolefins are preferred.

The polyolefins, one of said other components, are not particularly limited in kind, and contain those known in the art. Examples of the polyolefins are polyethylene, polypropylene, polybutene, polypentene, ethylene-vinyl acetate copolymer(EVAc), ethylene-vinyl alcohol copolymer(EVA), ethylene-propylene rubber (EPR) and ethylene-propylene-diene rubber (EPDM).

Additional examples of the thermoplastic polymer, which is one of said other components, are polyamide such as nylon 6 and nylon 66; polyalkylene terephthalates such as polyethylene terephthalate and polybutylene terephthalate; poly(meth)acrylates such as polymethylmethacrylate and polymethylacrylate; and polyphenylene sulfides.

The fillers, one of said other components, are not particularly limited in kind. Examples thereof are reinforcing fibers such as glass fiber, carbon fiber, aramid fiber, aluminum fiber and stainless steel fiber; inorganic fillers such as metal whisker, silica, alumina, calcium carbonate, talc, mica, clay, kaolin, magnesium sulfate, carbon black, titanium oxide, zinc oxide and antimony trioxide; anti-oxidants; weather resistance improving agents; nucleating agents for polyolefin; slip agents; flame retardants; flame resisting auxiliaries; plasticizers; various sorts of coloring agents; antistatic agents and mold release agents.

A process for producing the polyphenylene ether resin composition in accordance with the present invention is not particularly limited. There can be exemplified a process wherein the component (A), the component (B) and, if desired, the other components such as the component (C) are melt-kneaded to obtain the desired polyphenylene ether resin composition. A method of the melt-kneading is not particularly limited, and one example thereof is a melt-kneading method using an extruding machine. A method of feeding respective components in the extruding machine is not particularly limited, and contains, for example, a method wherein respective components are collectively fed therein; a method wherein respective components are dividedly fed therein; and a method wherein a pre-kneaded product of respective components is fed therein. A temperature of the melt-kneading is not lower than a glass transition point of the polyphenylene ether resin (about 210° C.), preferably from about 220 to 400° C., more preferably from about 230 to 350° C.

A molding method of the polyphenylene ether resin composition in accordance with the present invention is not particularly limited, and the molded products are not also limited in their shape. The molding method contains, for example, injection molding, extrusion molding, compression molding and blow molding.

The molded products obtained from the polyphenylene ether resin composition in accordance with the present invention can be effectively applied for uses particularly where a flame resistance is required, for example, uses of electric and electronic parts such as flyback transducers, deflection yokes, connectors, relay housings and coil bobbins; uses of electric containers such as battery cases; and uses of structure parts such as developing tanks, fans, fan housings, housings of office automation instruments, chassis for office automation instruments and trays.

According to the present invention, there can be provided a polyphenylene resin composition comprising a polyphenylene ether resin and a specific organopolysiloxane, comprising neither a halogen-containing flame retardant nor a phosphorus-containing flame retardant as an essential component, and exhibiting a superior flame resistance. The resin composition of the present invention can be applied preferably for uses particularly where a flame resistance is required, for example, uses of electric and electronic parts.

EXAMPLES

The present invention is illustrated in more detail with reference to the following Examples, which are only illustrative, and are not limitative for the scope of the present invention.

Components used in Examples and Comparative Examples are as follows.

1. Polyphenylene Ether Resin (Component (A))

PPE: Poly(2,6-dimethyl-1,4-phenylene ether), its intrinsic viscosity measured in chloroform at 30° C. being 0.46 dl/g.

2. Organopolysiloxane
(1) SIP-1(Component (B))

A organopolysiloxane comprising the structure units represented by the formula (I), (II) and (III) and being within a scope of the present invention, named SH6018 which is produced by Dow Corning Toray Silicone Co., and a solid at 25° C. Based on the total mole of $R^1$, $R^2$ and $R^3$, a proportion of $R^1$, $R^2$ and $R^3$ standing for phenyl groups is 70% by mole, and that of $R^1$, $R^2$ and $R^3$ standing for methyl groups is 30% by mole, and based on the weight of said organopolysiloxane, a proportion of $R^4$, $R^5$ and $R^6$ standing for hydroxyl groups is 6% by weight, and the remaining $R^4$, $R^5$ and $R^6$ are methyl groups. A weight average molecular weight of SIP-1 measured by a gel permeation chromatography (GPC), AS-8020 manufactured by Tosoh Corporation was found to be 1130 in terms of polystyrene.

(2) SIP-2(Component (B))

A organopolysiloxane comprising the structure units represented by the formula (I), (II) and (III) and being within a scope of the present invention, named R910 which is produced by Dow Corning Toray Silicone Co., and a solid at 25° C. All $R^1$, $R^2$, $R^3$, $R^4$, $R^5$ and $R^6$ are methyl groups.

(3) SIP-3(Component (B))

A organopolysiloxane comprising the structure units represented by the formula (I), (II) and (III) and being within a scope of the present invention, named DC3074 which is produced by Dow Corning Toray Silicone Co., and a liquid with a coefficient of kinematic viscosity=$1.5 \times 10^{-5}$ $m^2/s$ at 25° C. Based on the total mole of $R^1$, $R^2$ and $R^3$, a proportion of $R^1$, $R^2$ and $R^3$ standing for phenyl groups is 70% by mole, and that of $R^1$, $R^2$ and $R^3$ standing for methyl groups is 30% by mole, and based on the weight of said organopolysiloxane, a proportion of $R^4$, $R^5$ and $R^6$ standing for methoxy groups is 18% by weight, and the remaining $R^4$, $R^5$ and $R^6$ are methyl groups. A weight average molecular weight of SIP-3 measured by a gel permeation chromatography (GPC), AS-8020 manufactured by Tosoh Corporation was found to be 1340 in terms of polystyrene.

(4) SIP-4(Component (B))

A organopolysiloxane comprising the structure units represented by the formula (I), (II) and (III) and being within a scope of the present invention, named DC3037 which is produced by Dow Corning Toray Silicone Co., and a liquid with a coefficient of kinematic viscosity=$1.2 \times 10^{-4}$ $m^2/s$ at 25° C. Based on the total mole of $R^1$, $R^2$ and $R^3$, a proportion of $R^1$, $R^2$ and $R^3$ standing for phenyl groups is 35% by mole, and that $R^1$, $R^2$ and $R^3$ standing for methyl groups is 65% by mole, and based on the weight of said organopolysiloxane, a proportion of $R^4$, $R^5$ and $R^6$ standing for methoxy groups is 18% by weight, and the remaining $R^4$, $R^5$ and $R^6$ are methyl groups. A weight average molecular weight of SIP-4 measured by a gel permeation chromatography (GPC), AS-8020 manufactured by Tosoh Corporation was found to be 1060 in terms of polystyrene.

(5) SIP-5(Component (B))

A organopolysiloxane comprising the structure units represented by the formulas (I) and (III) and an amino group (amino equivalent=1800), comprising no structure unit represented by the formula (II), and being beyond the scope of the present invention, named SF8417 which is produced by Dow Corning Toray Silicone Co., and a liquid with a coefficient of kinematic viscosity=$1.2 \times 10^{-3}$ $m^2/s$ at 25° C.

(6) SIP-6(Component (B))

A organopolysiloxane comprising the structure units represented by the formula (I), (II) and (III) and being within a scope of the present invention, named DC6-2230 which is produced by Dow Corning Toray Silicone Co., and a solid at 25° C. Based on the total mole of $R^1$, $R^2$ and $R^3$, a proportion of $R^1$, $R^2$ and $R^3$ standing for phenyl groups is 55% by mole, and that of $R^1$, $R^2$ and $R^3$ standing for methyl groups is 45% by mole, and based on the weight of said organopolysiloxane, a proportion of $R^4$, $R^5$ and $R^6$ standing for hydroxyl groups is 6% by weight, and the remaining $R^4$, $R^5$ and $R^6$ are methyl groups. A weight average molecular weight of SIP-6 measured by a gel permeation chromatography (GPC), AS-8020 manufactured by Tosoh Corporation was found to be 4010 in terms of polystyrene.

3. Other Components (1) Polystyrene Resin (Component (c))

HIPS: A high impact polystyrene, named H554 which is produced by Japan Poly Styrene Inc.

(2) Styrene Based Elastomer

SEBS: A hydrogenated styrene-butadiene-styrene block copolymer, named SEPTON 8006, which is produced by Kuraray Co.

Evaluation method of the physical properties are as follows.

1. Flexural Modulus

Measured according to ASTM D790 using a test piece of 3.2 mm in thickness.

2. Flame Resistance

The polyphenylene ether resin composition was injection molded under conditions of a cylinder temperature of 320° C. and a mold temperature of 80° C. to prepare respective test pieces of 3.2 mm, 1.6 mm and 0.8 mm in thickness. The UL 94 vertical combustion test was carried out using the resulting test pieces. In the evaluation of the flame resistance, the term "not coming under" means that the burning period of time is more than that prescribed under the UL-94 vertical combustion test, or that the test piece burns to a clump, and the term also expresses moan evaluation that is inferior to V-0, V-1 and V-2.

3. Average Particle Size of Dispersed Phase

A test piece of 3.2 mm in thickness prepared from the polyphenylene ether resin composition was cut from the center portion of cross section thereof by a microtome, thereby obtaining a very thin slice. The slice obtained was photographed by a transmission electron microscope. Particle sizes of the twenty particles selected randomly from the photograph were measured and an average value thereof was regarded as an average particle size. With respect to elliptical particles, the particle size thereof, d, were calculated by the formula, d=(long diameter+short diameter)/2, wherein the short diameter is a distance between two points formed by crossing a line vertically passing through the center of the long diameter with the ellipse.

EXAMPLE 1

Respective components in their blending proportions as shown in Table 1 were fed from a hopper of a continuous twin screw kneading machine (20 mm extruder manufactured by Toyoseiki Co.) set at a cylinder temperature of 280° C. and a screw rotation of 70 rpm and melt-kneaded to obtain respective polyphenylene ether resin compositions in the form of pellets. The obtained pellets were injection molded at a cylinder temperature of 320° C. and a mold temperature of 80° C., thereby obtaining test pieces of 3.2 mm, 1.6 mm and 0.8 mm in thickness, respectively. Evaluation results of these test pieces are as shown in Table 1.

EXAMPLES 2 to 5

Comparative Examples 1 and 2

Using respective components in their blending proportions as shown in Tables 1 and 2, test pieces were prepared in the same manner as in Example 1. Evaluation results of these test pieces are as shown in Tables 1 and 2. Here, in Comparative Example 1, no organopolysiloxane was used, and in Comparative Example 2, the organopolysiloxane (SIP-5) which is beyond the scope of the present invention was used.

Example 6 and 7

Example 1 was repeated, except that respective components in their blending proportions as shown in Table 1 were melt kneaded in a continuous twin screw kneading machine (an extruder, TEM 50A, manufactured by Toshiba Machine Co.) set at a cylinder temperature of 280° C. and a screw rotation of 200 rpm.

TABLE 1

| Examples | 1 | 2 | 3 | 4 | 5 | 6 | 7 |
| --- | --- | --- | --- | --- | --- | --- | --- |
| Blending proportions (by wt) | | | | | | | |
| PPE (component (A)) | 100 | 100 | 100 | 100 | 100 | 100 | 100 |
| HIPS (component (C)) | 25 | 25 | 25 | 25 | 25 | 25 | 25 |
| SEBS (other component) | 7 | 7 | 7 | 7 | 7 | 7 | 7 |
| SIP-1 (component (B)) | 7 | 0 | 0 | 0 | 0 | 0 | 7 |
| SIP-2 (component (B)) | 0 | 7 | 0 | 0 | 0 | 0 | 0 |

TABLE 1-continued

| Examples | 1 | 2 | 3 | 4 | 5 | 6 | 7 |
|---|---|---|---|---|---|---|---|
| SIP-3 (component (B)) | 0 | 0 | 7 | 0 | 0 | 0 | 0 |
| SIP-4 (component (B)) | 0 | 0 | 0 | 7 | 0 | 0 | 0 |
| SIP-6 (component (B)) | 0 | 0 | 0 | 0 | 7 | 7 | 0 |
| Evaluation | | | | | | | |
| Flexural Modulus (kg/cm²) | 24000 | 24000 | 24000 | 22000 | 25000 | 25000 | 25000 |
| Flame resistance | | | | | | | |
| 3.2 mm Thickness | V-1 | V-0 | V-1 | V-1 | V-1 | V-1 | V-1 |
| 1.6 mm Thickness | V-1 | V-1 | NCU | NCU | V-1 | V-1 | NCU |
| 0.8 mm Thickness | V-1 | NCU | NCU | NCU | NCU | V-1 | NCU |
| Average dispersed particle size (μm) | 0.25 | 2.0 | 0.6 | 0.4 | 1.5 | 0.1 | 0.05 |

Note:
"NCU" stands for "not coming under"; meaning that the burning period of time is more than that prescribed under the UL-94 vertical combustion test, or that the test piece burns to a clump, and the term also expresses an evaluation that is inferior to V-0, V-1 and V-2.

TABLE 2

| Comparative Examples | 1 | 2 |
|---|---|---|
| Blending proportion (by wt) | | |
| PPE | 100 | 100 |
| HIPS | 25 | 25 |
| SEBS | 7 | 7 |
| SIP-5 | 0 | 7 |
| Evaluation | | |
| Flexural Modulus (kg/cm²) | 23000 | 24000 |
| Flame resistance | | |
| 3.2 mm Thickness | NCU | NCU |
| 1.6 mm Thickness | NCU | NCU |
| 0.8 mm Thickness | NCU | NCU |
| Average dispersed particle size (μm) | | |

Note:
NCU stands for "not coming under"; see note at the end of Table 1.

What is claimed is:

1. A polyphenylene ether resin composition comprising:

a component (A) containing a polyphenylene ether resin; and a component (B) containing an organopolysiloxane comprising respective structure units represented by the following formulas (I), (II) and (III)

$$R^1R^2SiO_{1.0} \quad (I)$$

$$R^3SiO_{1.5} \quad (II)$$

$$R^4R^5R^6SiO_{0.5} \quad (III)$$

wherein $R^1$, $R^2$ and $R^3$ are independently of one another an alkyl group having 1 to 3 carbon atoms or an aryl group having 6 to 10 carbon atoms, and $R^4$, $R^5$ and $R^6$ are independently of one another an alkyl group having 1 to 6 carbon atoms, an aryl group having 6 to 12 carbon atoms, an alkoxy group having 1 to 6 carbon atoms or a hydroxyl group; and wherein:

(i) the component (B) is present in an amount of from about 0.5 to 100 parts by weight based on 100 parts by weight of the component (A); and (ii) the component (A) forms a continuous phase, and the component (B) forms a dispersed phase containing dispersed particles; and wherein an average particle size of the dispersed particles is from about 0.08 to 5 μm.

2. The polyphenylene ether resin composition according to claim 1, wherein the component (B) comprises an organopolysiloxane, which is a solid at 25° C.

3. The polyphenylene ether resin composition according to claim 1, wherein a weight average molecular weight of the component (B) is from about 500 to 9500 in terms of polystyrene.

4. The polyphenylene ether resin composition according to claim 1, wherein a proportion of $R^1$ and $R^2$ in the formula (I) and $R^3$ in the formula (III), which stands for aryl groups, is from about 30 to 80% by mole based on the total mole amount of $R^1$, $R^2$ and $R^3$.

5. The polyphenylene ether resin composition according to claim 4, wherein the aryl groups contain a phenyl group.

6. The polyphenylene ether resin composition according to claim 1, wherein $R^4$, $R^5$ and $R^6$ in the formula (III) are methyl groups or hydroxyl groups.

7. The polyphenylene ether resin composition according to claim 1, wherein a ratio of a content proportion of the structure unit represented by the formula (I) to a content proportion of structure unit represented by the formula (II) is from about 10:1 to 0.1:1.

* * * * *